UNITED STATES PATENT OFFICE.

EDWARD BRADY, OF PHILADELPHIA, PENNSYLVANIA.

IMPROVED MODE OF PURIFYING IRON.

Specification forming part of Letters Patent No. 88,941, dated April 13, 1869.

*To all whom it may concern:*

Be it known that I, EDWARD BRADY, of the city of Philadelphia, State of Pennsylvania, have invented a new and improved method of producing pure iron or steel and malleable iron direct from the crude iron; and do hereby declare the following to be a full description thereof.

The nature of my invention consists in mingling and manipulating by common mechanical processes sulphurous acid at a high degree of temperature and roasted pulverized lime with iron in a heated or molten state, at a similar temperature as nearly as may be; and also in mixing and manipulating crude iron ore, ground or reduced to a powder, with sulphate of lime, sulphate of soda, sulphate of alumina, or with any alkaline sulphate, pulverized, and both having been roasted or otherwise assimilated to about equal degrees of temperature, and then a fusion or melting of the metal to be made by the usual methods in an ordinary furnace, the chemical changes or results consequent thereupon separating, dissipating, and combining and depositing the impurities of silica, sulphur, &c., and leaving the molten iron pure, and converting it into steel or malleable iron.

The oxygen being disengaged by a decomposition of the sulphurous acid or of the dry sulphate caused by a fusion or melting of the iron or crude iron ore, will unite with the carbon, or a portion thereof, in the iron, and will pass off as carbonic-acid gas, and sulphuret of iron, phosphoret of iron, &c., will remain in the molten iron mass, and these having a strong affinity for the lime, silica, &c., will combine and form slags, which latter will be deposited at the bottom of the furnace by specific gravity, leaving the hot iron free from the impurities of silica, sulphur, carbon, phosphorus, &c., and converting it into steel by drawing it off and suddenly cooling it in bars, &c., by immersion in cold water or gradually cooling and rolling or hammering it into malleable iron.

The quantities or proportions of materials and ingredients to be used cannot be specified very definitely, because the same depends upon the greater or lesser amounts or shares of the impurities contained in the iron or crude iron ore, and which vary materially according to its quality, requiring a larger or smaller quantity or proportion of the dry sulphate, &c., to be determined by a practical experience in each instance.

What I claim as my invention, and desire to secure by Letters Patent, is—

Mingling and manipulating, by common mechanical processes, sulphurous acid, at a high degree of temperature, and roasted pulverized lime with iron in a heated or molten state, at a similar temperature as nearly as may be, and also mixing and manipulating crude iron ore, ground or reduced to a powder, with sulphate of lime, sulphate of soda, sulphate of alumina, or with any alkaline sulphate, pulverized, and both having been roasted or otherwise assimilated to about equal degrees of temperature, and then a fusion or melting of the metal to be made by the usual methods in an ordinary furnace, the chemical changes or results consequent thereupon separating, dissipating, and combining and depositing the impurities of silica, sulphur, &c., and leaving the molten iron pure and converting it into steel or malleable iron, substantially as set forth.

EDWARD BRADY.

Witnesses:
   EDW. BRADY, Jr.,
   WM. F. BRADY,
   MARGARET HALL.